E. G. ERVIN & F. C. SMITH.
AUTOMATIC EXPOSURE SPACING MACHINE FOR ROLL FILMS FOR CAMERAS.
APPLICATION FILED AUG. 10, 1916.

1,232,254.                                          Patented July 3, 1917.

Inventors
Edwin Gamble Ervin
Floyd Crawford Smith

Witnesses
James E. Thomas
J. R. Thomas

UNITED STATES PATENT OFFICE.

EDWIN GAMBLE ERVIN AND FLOYD CRAWFORD SMITH, OF STILWELL, OKLAHOMA.

AUTOMATIC EXPOSURE-SPACING MACHINE FOR ROLL-FILMS FOR CAMERAS.

1,232,254.        Specification of Letters Patent.     Patented July 3, 1917.

Application filed August 10, 1916. Serial No. 114,304.

*To all whom it may concern:*

Be it known that we, EDWIN GAMBLE ERVIN and FLOYD CRAWFORD SMITH, citizens of the United States, and residents of Stilwell, in the county of Adair and State of Oklahoma, have invented a new and useful Automatic Exposure-Spacing Machine for Roll-Films for Cameras, of which the following is a specification.

Our present invention relates generally to cameras, and more particularly to film winding mechanism utilized in connection therewith to automatically wind the film in advancing unexposed sections for exposure, manually controlled to operate after each exposure for this purpose, our object being to provide a comparatively simple inexpensive arrangement which may be readily utilized in connection with cameras now in use, or which may be constructed in connection with a camera to form a part thereof.

Figure 1:
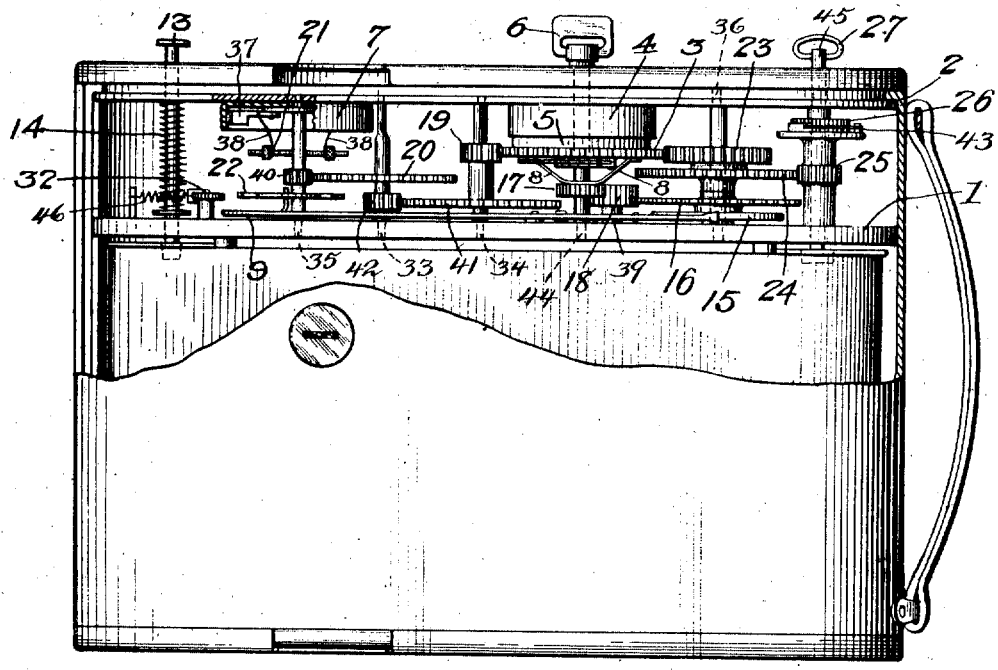
Figure 2:
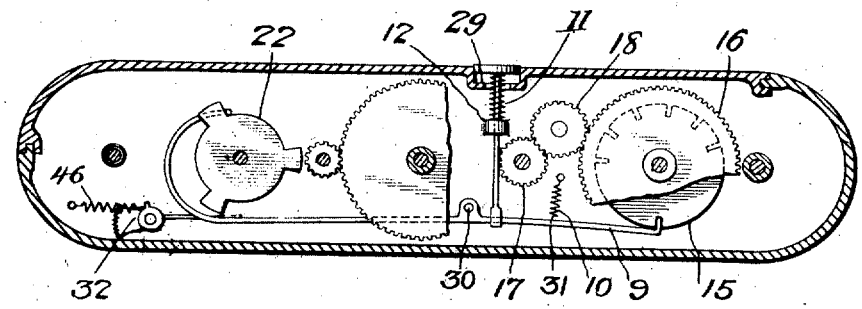

Other objects relating for the most part to the details of construction of our improved mechanism, will more clearly appear from the following description thereof, reference being made to the accompanying drawings in which:

Figure 1 is a rear elevation of a camera, a portion of the casing of which is broken away to show our improved mechanism, parts of which also are in section, and Fig. 2 is a longitudinal section through the camera in the plane of the mechanism proposed by our invention.

Referring now to these figures, our improvements are preferably mounted in connection with a camera, as seen in the two figures, between inner and outer parallel plates 1 and 2, which the usual casing of the camera is preferably extended to cover, the shaft of the feed roll and take-up roll of the film, indicated at 13 and 45 respectively, being preferably extended through the plates 1 and 2, and the former being preferably provided with a tension spring 14 coiled therearound, as seen in Fig. 1, in order to tension the movements of the film and hold the same substantially taut at all times.

The film winding mechanism as proposed by our invention includes, among other parts, a gear wheel 3 having a ratchet connection upon a shaft 44 on which said gear is revoluble, this gear being actuated by a spring 5 within a spring housing 4, the latter of which is attached to the outer plate 2, as seen in Fig. 1, this spring being secured at its inner end to the shaft 44 and the latter provided with an external key 6 by means of which it may be rotated to wind the spring 5 from time to time when necessary or desired, gear 3 being connected to another gear 17 mounted upon the same shaft 44 by means of the arms 8 in Fig. 1.

The gear 17 drives a gear 16 mounted upon a shaft 36, through an idler 18, and the gear 3 before mentioned drives a gear 23 mounted upon the same shaft 36, gear 23 being secured to a gear 24, and gear 16 being secured to a controlling disk 15 having a series of peripheral notches at one side, and a single peripheral notch at its opposite side isolated from the series of notches, the notches of the series being spaced apart, as seen by reference to Fig. 2, for a purpose to be presently described.

Mounted upon the take-up shaft 45 is a sleeve having a gear 25 in connection with the gear 24, and provided with a pawl 43 in engagement with a ratchet wheel 26 secured upon the said shaft 45 so as to thus provide for manual rotation of the take-up shaft, as well as its automatic rotation from the spring actuated gear 3 through the gears 23, 24, and 25 and the ratchet connection 43, 26.

At its diametrically opposite side, as compared with the gear 23, the spring actuated gear 3 is in mesh with a gear 19 upon a shaft 34, having a gear 41 in mesh with a gear 42 upon the shaft 33, gear 42 being secured to a gear 20, the latter of which is in mesh with the gear 40 of a shaft 35 on which is secured a locking disk 22 having its periphery slotted to provide spaced outstanding projections for a purpose to be presently described.

Adjacent the opposite end of shaft 35 are governor levers 37 operating against the inner surface of a housing 7 secured to the plate 2, the object of which is to control the speed of the gear train and check excessive momentum, the governor levers 37 being taken in or let out for purposes of adjustment, by means of spring wires 38 controlled by nuts mounted upon the threaded stem connected to the shaft 35.

Intermediately pivoted at 30 upon the inner plate 1 is a manually shiftable locking arm 9, one angular end of which is held in engagement with the periphery of the controlling disk 15 by means of a spring 10, and the opposite end of which is bent to extend partially around the locking disk 22 and is provided with an upstanding extremity normally engaging one of the projections of the said locking disk to retain the film winding mechanism inoperative.

A manually movable stem extending through a bearing 12, as shown in Fig. 2, is attached at one end to the controlling arm 9 and is provided at its opposite end with a finger piece or push button 29, this stem being controlled by a spring 11 so as to normally hold the button in outer position and the locking arm 9 in the active position shown in Fig. 2.

In order, furthermore, to lock the disk 22 and obviate its accidental release when the back of the camera is removed for loading or withdrawing a film, a pivoted member 32 is provided for engagement with said locking disk, and is movable under actuation of a spring 46, to engage the same, this member 32 being engaged by the back of the camera when the same is closed, as seen in Fig. 2, in order to hold the said member in inoperative position.

Thus with the spring 5 wound and the film adjusted upon the feed and take-up rolls, and moved to a position where the usual indicating arrow appears through the rear sight opening of the cover of the camera, and with the controlling end of the arm 9 in engagement with the isolated notch of the disk 15 as shown in Fig. 2, inward pressure upon the push button or finger piece 29 serves to rock the arm 9 upon its fulcrum 30 to release the angular end thereof from the notched disk 15 and simultaneously move its opposite upstanding extremity out of engagement with the projections of the locking disk 22. Immediately upon such movement the gear train will start in operation by virtue of the spring 5, so that rotation will be communicated to the take-up shaft 45 and movement of the film started, release of the push button permitting the spring 10 to draw the angular end of the arm 9 against the periphery of the disk 15 so as to drop into the first of the series of slots when the gear train has rotated the disk 15 until the first of the series of slots is opposite the said angular extremity. The instant the angular extremity of the arm 9 drops into the first of the series of slots, the rocking of the arm upon its fulcrum 30 shifts the opposite upstanding extremity thereof into locking engagement with the disk 22 once more, thus checking rotation of the gear train until the push button 29 is again actuated.

It will thus be understood that the spacing between the isolated slot of the disk 15 and the first and last notches of the series of notches, takes care of the rolling up of the film through its first exposure space, and the winding of the film to complete the roll after the last exposure has been made, and that the spacing between the several slots of the series of slots, takes care of the winding of the film to advance the same between exposures.

It is further obvious that our invention provides for the above means simple and comparatively inexpensive connections, which will be strong and durable in use, which may be utilized either as an attachment in connection with cameras already in use, or as a part of a camera in the first instance, and that our improvements will be effective and efficient for the several purposes stated.

We claim:

1. In a film winding apparatus, the combination with the shaft of the take-up roll, of a spring actuated gear train having a ratchet connection with said shaft, a controlling disk rotated by said gear train and having a series of spaced apart notches extending around a portion of its periphery, and having a single notch at another portion thereof isolated from the series of notches, a locking disk also rotated by said gear train, having its periphery slotted to provide a series of projections, an intermediately pivoted controlling arm having one end provided with an upstanding extremity normally engaging one of the projections of said locking disk, said arm having an angular extremity at its opposite end, engageable with the periphery of the said controlling disk, and movable into the notches thereof, a spring normally holding said arm in its engaged operative position, and a stem connected to the arm and provided with an externally disposed push button, whereby the arm may be shifted manually against the tension of its spring.

2. In a film winding apparatus, the combination with the shaft of the take-up roll, of a spring actuated gear train having a ratchet connection with said shaft, a controlling disk rotated by said gear train and having a series of spaced peripheral notches, a locking disk also rotated by said gear train, an intermediately pivoted controlling arm having one end normally engaging said locking disk and having an angular extremity at its opposite end engageable with the periphery of the said controlling disk, and movable into the notches thereof, a spring normally controlling said arm, and a manually controlled push button connected to said arm, for the purpose described.

3. In a film winding apparatus, the combination with the shaft of the take-up roll, of a spring actuated gear train having a ratchet connection with said shaft, locking means for the gear train including a manually shiftable locking arm, and a controlling member consisting of a notched disk normally engaged by a portion of said locking arm.

4. In a film winding apparatus, the combination with the shaft of the take-up roll, of a spring actuated gear train having a ratchet connection with said shaft, a governor mechanism connected to and controlling movement of the gear train in operation, locking means for the gear train normally holding the same inactive, and including a locking disk, and a manually shiftable locking arm normally in engagement at one end with said locking disk, and a controlling member consisting of a notched disk normally engaged by the opposite end of said arm.

5. In a film winding apparatus, the combination with the shaft of the take-up roll, of a spring actuated gear train having a ratchet connection with said shaft, and locking means for the gear train including a locking disk and a controlling disk rotated by said gear train, a spring controlled locking arm having means simultaneously shiftable into and out of engagement with said locking and controlling disks, and a spring normally holding said arm in engaged position, and manually actuated means for shifting said arm to disengaged position.

6. In a film winding apparatus, the combination with the shaft of the take-up roll, of a spring actuated gear train having a ratchet connection with said shaft, locking means for the gear train including a locking disk and a controlling disk rotated by said gear train, an intermediately pivoted locking arm having a controlling spring, and engageable at one end with said locking disk and at its opposite end with said controlling disk, and manually actuated means connected to said arm for shifting the latter to released position.

EDWIN GAMBLE ERVIN.
FLOYD CRAWFORD SMITH.